United States Patent [19]

Parker et al.

[11] Patent Number: 4,715,286

[45] Date of Patent: Dec. 29, 1987

[54] CONVEYER SYSTEM

[75] Inventors: Preston K. Parker; Roy T. Tousant, both of Louisville, Ky.

[73] Assignee: General Electric Company, Louisville, Ky.

[21] Appl. No.: 802,389

[22] Filed: Nov. 27, 1985

[51] Int. Cl.⁴ .............................................. B65G 17/40
[52] U.S. Cl. ..................................... 104/88; 104/172.3
[58] Field of Search ............ 104/88, 140, 165, 172 R, 104/172 B, 172 C, 172.1, 172.3, 172.5; 198/852, 465.1, 803.01, 803.2, 831, 367; 209/657, 925

[56] References Cited

U.S. PATENT DOCUMENTS

| | | | |
|---|---|---|---|
| 1,817,373 | 8/1931 | Hopkins | 198/852 |
| 1,930,318 | 10/1933 | Mojonnier | 198/367 X |
| 2,635,555 | 4/1953 | Hansson | 104/88 |
| 2,940,400 | 6/1960 | Harrison | 104/88 |
| 3,127,849 | 4/1964 | Klamp | 104/88 |
| 3,174,438 | 3/1965 | Hariton | 104/88 |
| 3,338,177 | 8/1967 | Mirel | 104/88 |
| 3,357,539 | 12/1967 | Naslund | 198/366 |
| 3,580,391 | 5/1971 | Littlefield | 209/657 X |
| 3,599,789 | 8/1971 | Kurczak | 209/657 X |
| 3,639,728 | 2/1972 | Helfand et al. | 209/657 X |
| 3,648,618 | 3/1972 | Pierson et al. | 104/172 BT X |
| 3,673,967 | 7/1972 | Kropf | 104/88 |
| 3,722,426 | 3/1973 | Beer | 104/88 |
| 3,768,631 | 10/1973 | Wahren | 198/852 |
| 3,892,372 | 7/1975 | Hauber | 406/2 |
| 4,069,764 | 1/1978 | Teyssedre | 104/88 |
| 4,106,636 | 8/1978 | Ouimet et al. | 104/88 X |
| 4,160,500 | 7/1979 | Vermehren | 198/831 X |
| 4,265,178 | 5/1981 | Veith | 104/88 |
| 4,416,202 | 11/1983 | Rooklyn | 104/88 |
| 4,466,530 | 8/1984 | Stückler | 198/472 |

Primary Examiner—Robert B. Reeves
Assistant Examiner—Thomas W. Kearns
Attorney, Agent, or Firm—Frederick P. Weidner; Radford M. Reams

[57] ABSTRACT

A conveyor system including a first horizontal trackway having a flat movable flexible chain extending between a plurality of work stations with the trackway having at one end thereof a loop section. There are a plurality of pallets movable by frictional engagement with the chain for carrying work pieces along the trackway between the work stations. A second trackway is provided adjacent the first trackway loop section and has a continuous flat flexible chain, the second trackway has an upper level section and a lower level section with the upper level section being in the same horizontal plane as the first trackway. The second trackway has two legs connected by an intermediate section with both legs in pallet transfer communication with the first trackway. The lower level section of the second trackway is spaced below the upper level section and has two legs connected by an intermediate section with each leg of the lower level section being connected to a corresponding leg of the upper level section to form a continuous loop. The second continuous trackway is driven independent of the first trackway and there is a switch for diverting the pallets to either the first trackway loop section or the upper level of the second trackway.

7 Claims, 6 Drawing Figures

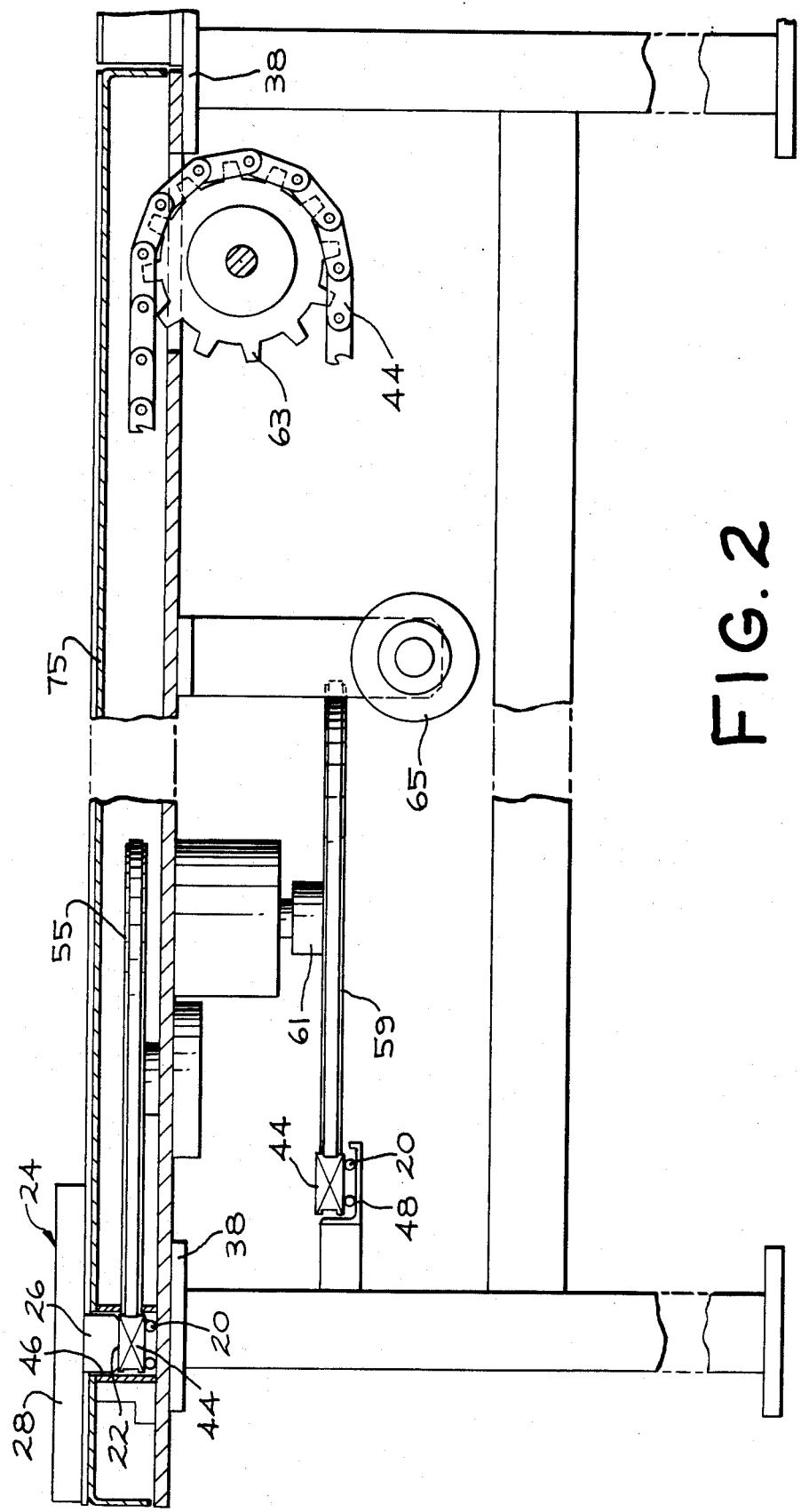

CONVEYER SYSTEM

BACKGROUND OF THE INVENTION

Conveyor systems of various types are well known in the prior art. One typical type of conveyor system often found in manufacturing plants is a type wherein there is provided a conveyor means mounted on uprights or standards and embodying flexible chains that flex in both horizontal and vertical directions allowing construction of conveyors that will by friction engagement move a plurality of pallets from one station to another station. These chains may be made from metal or plastic and one company that makes such chains for conveyor systems is Rexnord Incorporated.

In using such a conveyor system work pieces are usually mounted on individual pallets and conveyed to a series of stations where a mechanical operation takes place to make or assemble the work pieces. In automating assembly of work pieces it is highly desirable to have quality inspections done at least at one station and many times at several or all of work stations so that when the work piece is completely assembled it is satisfactory. If during the transfer of the pallets carrying the work pieces the inspection indicates that a work piece is defective in some manner, that work piece should be subjected to independent rework or repair and further inspection to make it satisfactory. It is desirable that if during the transfer of work pieces from one station to the next it is found through inspection that the work piece is defective, it should be removed from the line and repaired and placed back on the line automatically. In most all continuous conveyor systems there is a problem of how to conveniently place the repair station and have the pallets carrying the work piece to be repaired removed from the line automatically and placed back on the line with a minimum of disruption of the main assembly line.

By this invention there is provided a conveyor system having a repair track that operates independently of the main transfer track system and has switching means for diverting the pallets containing the work pieces to be repaired to the repair track and after repair returning the pallets to the main conveyor track system.

SUMMARY OF THE INVENTION

A conveyor system comprising a first horizontal trackway having a flat movable flexible chain extending between a plurality of work stations and the trackway has a loop section at one end thereof. A plurality of pallets movable by frictional engagement with the flexible chain are provided for carrying work pieces along the trackway between the work stations. A second trackway is located adjacent the first trackway loop section and has a continuous flat flexible chain with an upper level section and a lower level section with the upper level section being in the same horizontal plane as the first trackway. The upper level has two legs connected by an intermediate section with both of the legs in pallet transfer communication with the first trackway. The lower level section of the second trackway is spaced below the upper level section and has two legs connected by an intermediate section with each leg of the lower level section being connected to a corresponding leg of the upper level section to form a continuous loop. Drive means are provided for moving the continuous chain of the second trackway independent of the first trackway chain and there are switching means for diverting the pallets to either the first trackway loop or the upper level of the second trackway

BRIEF DESCRIPTION OF THE DRAWINGS

With reference to the accompanying drawing,

FIG. 2 is a side elevational view taken along lines 2—2 of FIG. 1 with parts broken away and showing a portion of the conveyor system of the present invention.

DESCRIPTION OF THE PREFERRED EMBODIMENT

Figure 4:
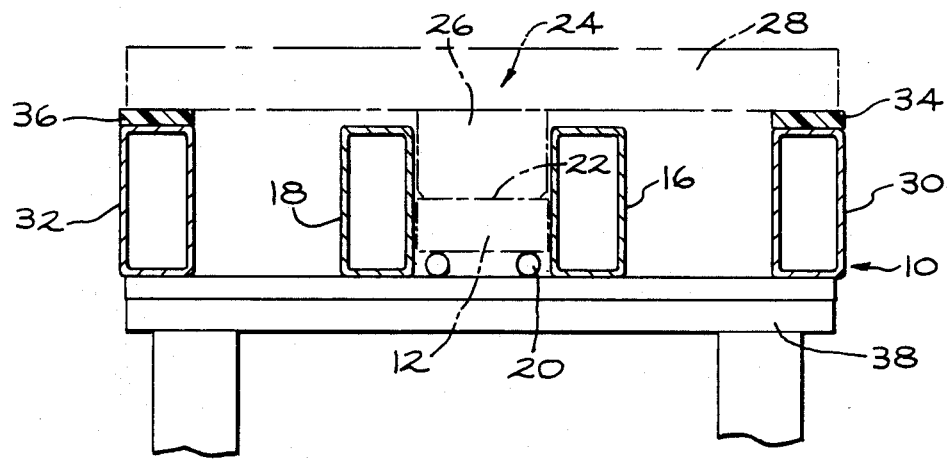
FIG. 4 is a cross-sectional view of a portion of the conveyor system of the present invention taken along lines 4—4 of FIG. 1.

With reference to accompanying drawings, there is shown, particularly in FIGS. 1, 2, 3 and 4, a first horizontal trackway 10 having a flat movable flexible chain 12 which may extend between a plurality of work stations (not shown) and the trackway has a loop section 14 at one end thereof. The flexible chain 12 may be driven by any convenient means and follows along between two center guide rails 16 and 18. With reference particularly to FIG. 4, the flexible chain 12 is pulled over chain wear strips 20 and the upper flat surface 22 of the chain 12 has resting on it a pallet 24. Pallet 24 has a center downwardly directed member 26 which contacts the upper surface 22 of the chain 12 and has a work piece supporting member 28 that will carry the work pieces through a plurality of work stations as the pallet is being carried by frictional engagement with the flexible chain 12 around the trackway 10. The work piece supporting member 28 is additionally supported by outside rails 30 and 32 which have between the upper surface of the rail and the pallet low friction strips 34 and 36 which are secured to the outside rails 30 and 32 respective. It will be noted particularly in FIG. 4 that the first trackway 10 is supported on a stand 38 so that the work pieces (not shown) supported on the pallets 24 are elevated to a working height above the floor. As can be seen, particularly in FIG. 1, the first trackway 10 has a straight section 37 leading from a work station (not shown) and makes a right angle curve bend into the loop section 14 and in that bend there is placed a corner disk 40 which guides the flexible chain 12 around the bend. The chain makes a right angle curve bend leaving the loop section 14 and is also guided by a corner disk 41 back to a straight section 39 of the first trackway. The direction of movement of the chain 12 is shown by arrows.

Figure 3:
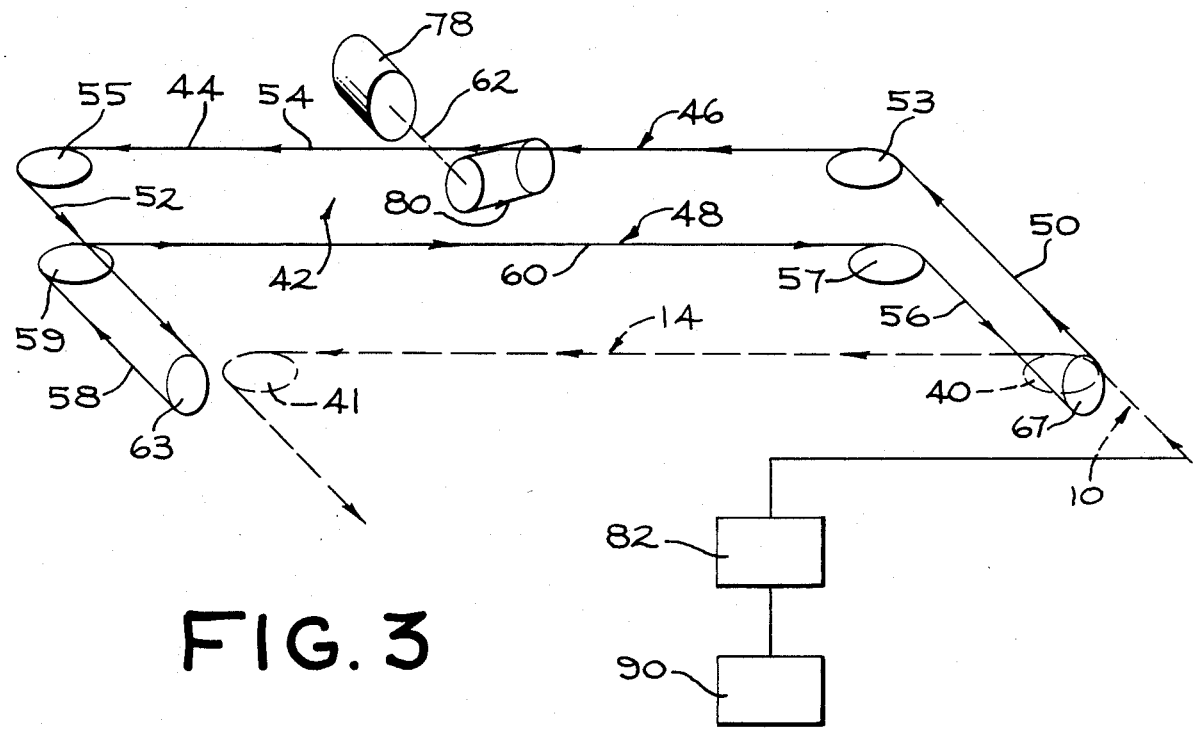
FIG. 3 is a schematic view of the conveyor system of the present invention showing the arrangement of the trackways.

Adjacent the first trackway loop section 14 is a second trackway 42 which has a continuous flat flexible chain 44. The second trackway has an upper level section 46 and a lower level section 48 (FIGS. 2 and 3) with the upper level section being in the same horizontal plane as the first trackway 10. With reference to FIG. 3 the upper level has two legs 50 and 52 connected by an intermediate section 54 with both of the legs 50 and 52 in pallet transfer communication with the first trackway 10. Intermediate section 54 is parallel to loop section 14 of the first trackway 10. The lower level section 48 of the second trackway 42 is spaced below the upper level section 46 and it has two legs 56 and 58 connected by an intermediate section 60. Each leg 56 and 58 of the lower level section 48 is connected to a corresponding leg 50 and 52 respectively of the upper level section 46 to form a continuous loop as best seen in FIG. 3. The right angle curve bends of the upper level section 46 have corner disks 53 and 55 and the lower level section 48 have corner disks 57 and 59, each being supported by a bearing structure 61 (FIG. 2) secured to the frame 38 which disks rotate and guide the flexible chain 44. The transition reverse bend of the second trackway between the legs 56 and 58 of the lower level section 48 and the legs 50 and 52 respectively of the upper level section 46 are guided by sprockets 63 and 67 respectivity which engage the chain 44 of the second trackway. To support the chain 44 between the sprockets 63 and 67 and the corner disks 57 and 59 are roller guides 65 (FIG. 2). The second trackway chain 44 is driven independently of the first trackway chain 12 and this may be done in any convenient manner such as by drive means 62 which by appropriate arrangement moves the continuous chain 44 in one direction. The second trackway 42 is constructed similar to that shown and described in connection with the first trackway 10 and is provided with center rails 64 and 66 and outside rails 68 and 70 which have low friction strips 79 and 81 respectively. The pallets 24 are guided and moved by frictional engagement with the second trackway chain 44 and supported on the rails 68 and 70 in the manner described above in connection with the first trackway 10. Portions of the first trackway 10 and its loop section 14 and the upper section 46 of the second trackway 42 have a cover 75 which is secured to the stand 38 by any suitable means. This cover 75 may have plastic guide members to assist in directing the pallets during their movement along the respective trackways.

Figure 1:
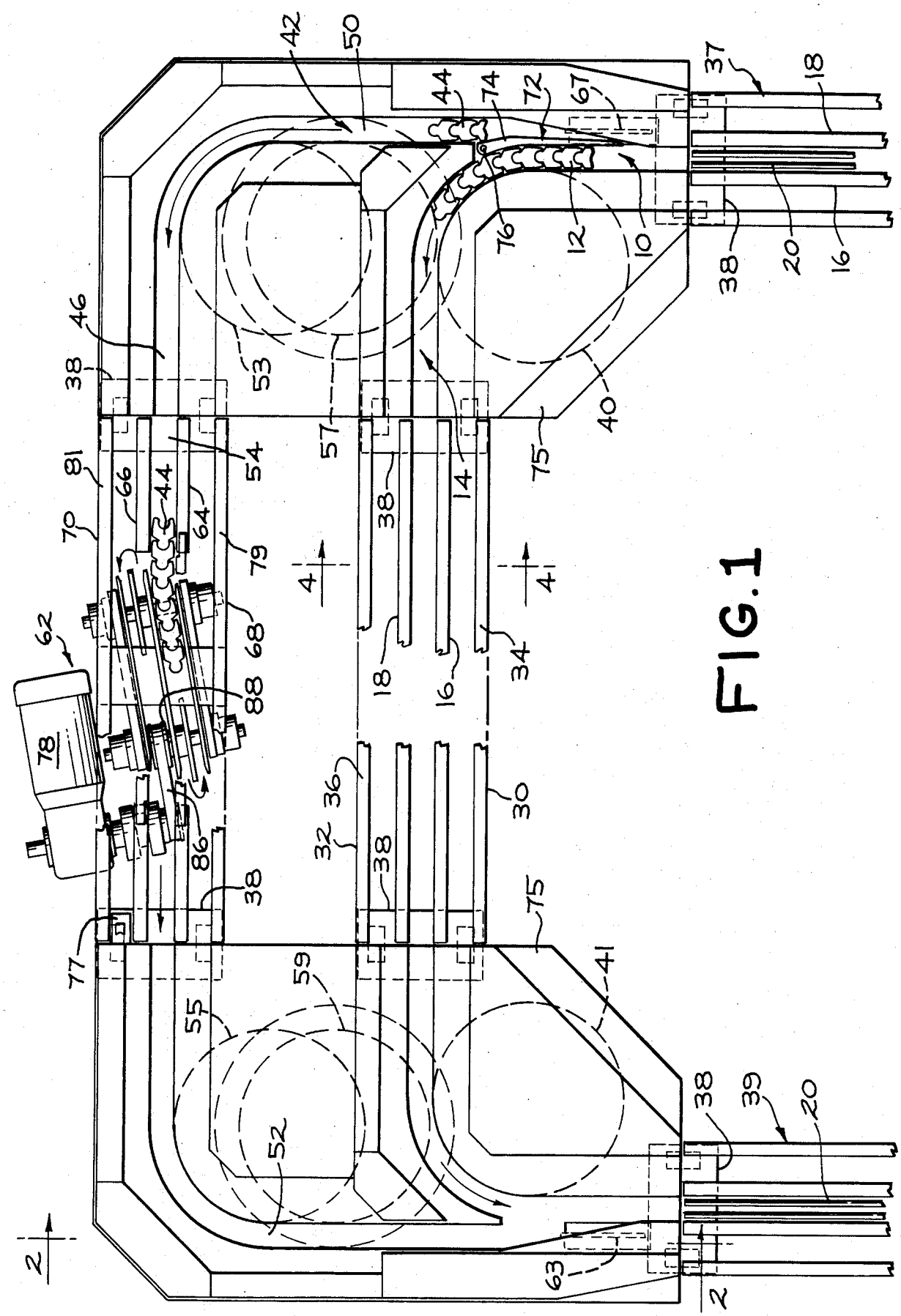
FIG. 1 is a top plan view of a portion of the conveyor system of the present invention.

With reference to FIG. 1, there is shown a switching means 72 for diverting the pallets 24 to either the first trackway loop section 14 or the upper level 46 of the second trackway 42. The switching means 72 may be an elongated finger member 74 movable about a pivot 76 and the finger member may be moved from a first position to a second position by any convenient means, such as an electromechanical arrangement (not shown). As seen in FIG. 1, the finger member 74 is in a position to allow the pallets to continue on the first trackway 10 and enter the loop section 14 thereof. The second position of the finger member 74 would be to move it about the pivot 76 across the first trackway chain 12 to block the passage of the pallets onto the loop section 14 and divert them onto the upper level section 46 of the second trackway chain 44 and onto leg 50 thereof. Because the second trackway chain 44 is moving the pallet would frictionally engage the trackway chain 44 and be directed along the upper level section 46. By appropriate stop means 77 along the upper level section the pallet would be retained for subsequent repair of the work piece carried by the pallet. Once the work piece has been reworked the stop means 77 is removed and by frictional engagement the pallet is moved by the chain 44 and returned to the first trackway via leg 52 of the upper level section 46.

Figure 5:
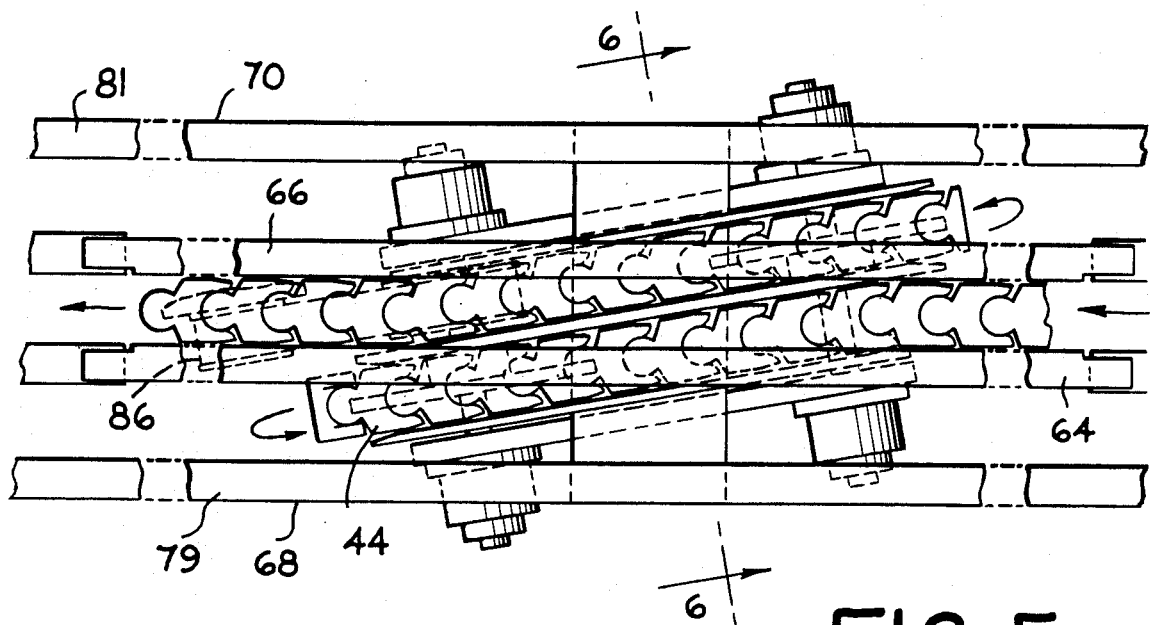
FIG. 5 is a top plan view of a portion of the conveyor system of the present invention showing a portion of the drive mechanism arrangement.
Figure 6:
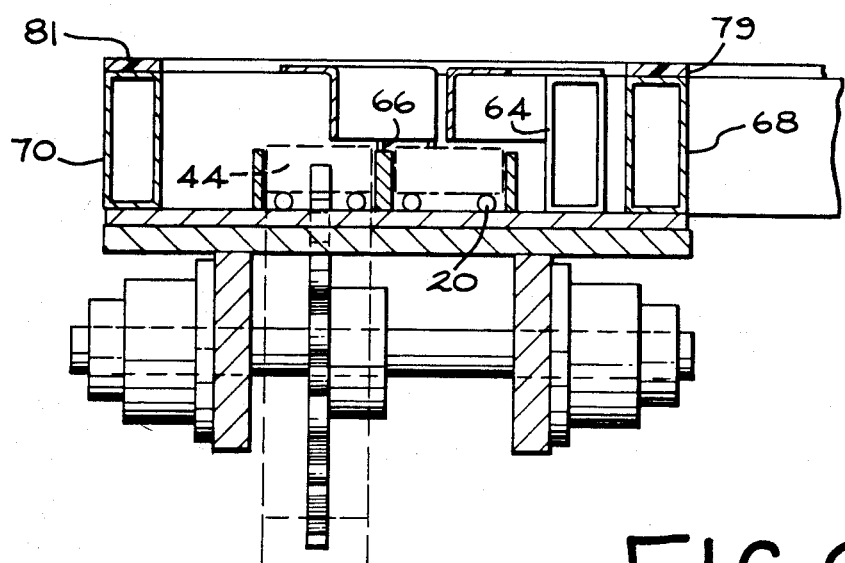
FIG. 6 is a side elevational view taken along lines 6—6 of FIG. 5 showing a portion of the conveyor system of the present invention.

With reference to FIGS. 1, 5 and 6, there is shown the preferred embodiment drive arrangement for the second trackway flexible chain 44 which is essentially a drive motor 78 (FIG. 1) which through a belt 86 and pulley arrangement 88 engages the chain 44 in the area of a reverse loop 80 and drives the chain in one direction. The chain 44 is reverse looped with the center rails 64 and 66 and outside rails 68 and 70 arranged to permit the pallet to move in the same horizontal plane and generally in the same direction. It will be understood that the pallet will leave a portion of the second trackway chain as the chain is being diverted downwardly into the loop 80 and is picked up by another portion of the second trackway chain as the chain is being directed upwardly from the loop and travels on its way between the inner rails 64 and 66. There are other arrangements that may be used to drive the second trackway flexible chain 44.

In automated assembly lines, including conveyor systems, it is desirable that at least one work station will inspect the work piece being carried by the pallet along the first trackway. Oftentimes, inspections take place at various work stations and sometimes all the work stations along the trackway. These inspections can consist of, for example, photoelectric sensors that detect if a part has actually been placed in the work piece assembly or if it has been skipped. Sensors can also detect misalignment of the respective parts in the work piece assembly, etc. By control means if a defect is found in the work piece, a code number corresponding to the pallet carrying the defective work piece may be stored in the control means. When the identified pallet reaches the defective work piece inspection station 82 immediately before the loop section 14 of the first trackway an appropriate signal from the control means 90 will signal the switching means 72 and move the finger member 74 to block passage of the pallet onto the loop section 14 and guides the pallet onto the second trackway 42 which would be leg 50 of the upper level section 46. The pallet carrying the defective work piece would be moved along the second trackway 42 until it reaches a stop 77 which retains the pallet until the defective work piece has been repaired whereupon the stop 84 is released and the pallet carrying the repaired work piece is permitted to travel by frictional engagement along the second trackway chain 44 and is deposited back onto the first trackway chain 12 at the junction between the downstream movement of the chain 12 and second trackway chain 44.

While there has been shown and described a specific embodiment of the invention, it will be understood that it is not limited thereto and it is intended by the appended claims to cover all such modifications as fall within the true spirit and scope of the invention.

What is claimed is:

1. A conveyor system comprising:
   a first horizontal trackway having a flat movable flexible chain extending between a plurality of work stations, said trackway having a loop section at one end thereof;
   a plurality of pallets movable by frictional engagement with the flexible chain for carrying work pieces along the trackway between the work stations;
   a second trackway adjacent the first trackway loop section and having a continuous flat flexible chain, said second trackway. having an upper level section and a lower level section with the upper level section being in the same horizontal plane as the first trackway and having two legs connected by an intermediate section with both of the legs in pallet transfer communication with the first trackway, the lower level section of the second trackway being spaced below the upper level section and having two legs connected by an intermediate section, each leg of the lower level section being connected to a corresponding leg of the upper level section to form a continuous loop;

drive means for moving the continuous second trackway independent of the first trackway; and switching means for diverting the pallets to either the first trackway loop section or the upper level of the second trackway.

2. The conveyor system of claim 1 wherein the loop section of the first trackway connects parallel sections of the trackway.

3. The conveyor system of claim 1 wherein the intermediate section of the upper level section of the second trackway is parallel to the loop section of the first trackway.

4. The conveyor system of claim 1 further comprising means to detect defective work pieces being carried along the first trackway and control means responsive to said means to detect defective work pieces to cause the switching means to divert the pallet carrying the defective work piece to the second trackway.

5. An automated conveyor system comprising:

a first horizontal trackway having a flat movable flexible chain extending between a plurality of work stations, said trackway having a loop section at one end thereof;

a plurality of coded pallets movable by frictional engagement with the flexible chain for carrying work pieces along the trackway between the work stations;

a second trackway adjacent the first trackway loop section and having a continuous flat flexible chain, said second trackway having an upper level section and a lower level section with the upper level section being in the same horizontal plane as the first trackway and having two legs connected by an intermediate section with both of the legs in pallet transfer communication with the first trackway, said upper level section intermediate section being parallel to the loop section of the first trackway, the lower level section of the second trackway being spaced below the upper level section and having two legs connected by an intermediate section, each leg of the lower level section being connected to a corresponding leg of the upper level section to form a continuous loop;

drive means for moving the continuous second trackway independent of the first trackway;

switching means for diverting the pallets to either the first trackway loop or the upper level of the second trackway;

sensor means to detect defective work pieces;

control means to identify coded pallets and store coded pallet identification responsive to said means to detect defective work pieces and then signal said switching means to cause the switching means to divert the coded pallet carrying the defective work piece to the second trackway; and stop means operable to retain and release the pallets diverted to the second trackway on the upper level section thereof.

6. The conveyor system of claim 5 wherein the loop section of the first trackway connects parallel sections of the trackway.

7. The conveyor system of claim 5 wherein the intermediate section of the upper level section of the second trackway is parallel to the loop section of the first trackway.

* * * * *